(12) United States Patent
Chen et al.

(10) Patent No.: US 7,606,268 B2
(45) Date of Patent: *Oct. 20, 2009

(54) METHOD AND APPARATUS FOR HANDING OFF CONTROL OF SERVICE ACCESS OVER A CABLE IP NETWORK

(75) Inventors: Jennifer H. Chen, San Jose, CA (US); Douglas M. Nortz, Red Bank, NJ (US); Robert J. Sayko, Colts Neck, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/877,380

(22) Filed: Oct. 23, 2007

(65) Prior Publication Data

US 2008/0037471 A1    Feb. 14, 2008

Related U.S. Application Data

(63) Continuation of application No. 10/315,587, filed on Dec. 10, 2002, now Pat. No. 7,292,590.

(51) Int. Cl.
*H04L 12/56* (2006.01)
*H04J 1/16* (2006.01)

(52) U.S. Cl. .................. 370/486; 370/352; 370/401; 379/88.17

(58) Field of Classification Search ......... 370/352–356, 370/400, 401, 486, 487, 252; 379/88.17
See application file for complete search history.

(56) References Cited

U.S. PATENT DOCUMENTS

| 6,870,830 | B1 | 3/2005 | Schuster et al. |
| 7,120,139 | B1 | 10/2006 | Kung et al. |
| 7,292,590 | B1 | 11/2007 | Chen et al. |
| 2002/0085517 | A1* | 7/2002 | Lee et al. .................. 370/331 |
| 2004/0077334 | A1 | 4/2004 | Joyce et al. |

* cited by examiner

*Primary Examiner*—John Pezzlo (57) ABSTRACT

In a communication network that provides a path through a cable IP network between sending and receiving terminals residing on respective networks (e.g., an HFC, and/or PSTN network) controlled by different network managers or service providers, a controller hands off control of service access of the terminals between the service providers. Subscriber terminals may include broadband telephony interfaces, cable modems, or multimedia terminal adapters. To effect hand-off control, configurable modules of the terminals enable them to respond directly to a network manager (e.g., cable modem termination system or call management server) according to instructions supplied by the controller based either on subscriber authorization, database information, call type, dialing plan, and/or other parameters. Transfer of call control may also occur on a call-by-call basis. Further, a usage server collects network usage information of the respective terminals or subscribers to determine user fees between competitive networks.

23 Claims, 7 Drawing Sheets

METHOD AND APPARATUS FOR HANDING OFF CONTROL OF SERVICE ACCESS OVER A CABLE IP NETWORK

This application is a continuation of co-pending U.S. patent application Ser. No. 10/315,587 filed Dec. 10, 2002 now U.S. Pat. No. 7,292,590 entitled METHOD AND APPARATUS FOR HANDING OFF CONTROL OF SERVICE ACCESS OVER A CABLE IP NETWORK, currently allowed, which is incorporated herein by reference.

BACKGROUND OF THE INVENTION

The present invention relates to a communication network, but more specifically to a method and an apparatus that hands off control of service access between service providers communicating through a cable IP network.

In some present-day circuit-switched environments, a service provider allows subscribers to communicate with other subscribers through a telephony network resale service. Such resale services are based on two known business models, i.e., a Total Services Resale (TSR) model and an Unbundled Network Elements (UNE) model. Both models involve complicated regulatory and financial arrangements for the exchange of network service fees among service and network providers.

A first object of the present invention is to provide a method and an apparatus for cable telephony network service access that avoids complicated inter-provider operations and billing processes of the prior art while allowing a calling party to designate his or her desired service provider on a per-call basis with minor changes to the existing network infrastructures.

A second object of the present invention is to provide a method and an apparatus for cable telephony network service access that decouples service provider selection from a network provider and that allows a selection of a service provider and/or call handling protocol based on criteria such as call type, dialing plan, destination, or other criteria.

A third object of the present invention is to provide a method and an apparatus for cable telephony network service access that allows a network provider to use a hand-off Call Management Server (CMS) and/or a network provider CMS to authorize users and then transfer call control to a CMS of competitive service provider. This avoids sending the dial-around traffic or primary carrier traffic to a circuit switch, e.g., a public switched telephone network (PSTN), for processing.

A fourth object of the present invention is to provide value-added services, such as videoconferencing, in a cable IP network that operates across multiple service providers.

SUMMARY OF THE INVENTION

In accordance with the invention, a method is provided of transferring call control between a first terminal and a second terminal communicating through a cable IP network where the first terminal resides on an originating network and the second terminal resides on a receiving network. A preferred method comprises the steps of controlling, by a first service provider, access of the first terminal relative to the originating network and cable IP network via a provisionable module that enables the first terminal to respond to call setup and control messages supplied thereto; controlling, by a second service provider, access of the second terminal relative to the receiving network and the cable IP network via a provisionable module that enables the second terminal to respond to call setup and control messages supplied thereto; and, in response to a call control parameter issued by a call agent communicating with the originating and receiving networks over the cable IP network, provisioning the first terminal to respond to call setup and control messages issued directly from the receiving network to effect a hand-off of control of the first terminal from the originating network to the receiving network.

In accordance with another aspect of the invention, an improvement in a communication network that provides a path through a cable IP network between a sending terminal of a sending network and a receiving terminal of a receiving network comprising a first network manager operated by a first service provider that manages network access of the sending terminal; a configuration module of the sending terminal that receives information defining a call setup and control protocol that controls access of said sending terminal to the sending network; a second network manager operated by a second service provider that manages network access of the receiving terminal; a configuration module of the receiving terminal capable of receiving a call setup and control protocol that controls access of said receiving terminal to the receiving network; and a call control agent in communication with the first and second network managers to effect a transfer of access control of the sending terminal from the first network manager to the second network manager in response to a call control parameter.

Other aspects and features of the invention will become apparent upon review of the following description taken in connection with the accompanying drawings. However, the invention is pointed out by the appended claims.

DESCRIPTION OF ILLUSTRATIVE EMBODIMENTS

The present invention is particularly suitable for implementation in a hybrid fiber coaxial Internet Protocol (HFC IP) network that provides IP telephony services over cable where various hardware and software elements are already in place. HFC networks generally include fiber and coaxial cable to link customer premises equipment (CPE) with a cable head-end distribution system.

Figure 1:
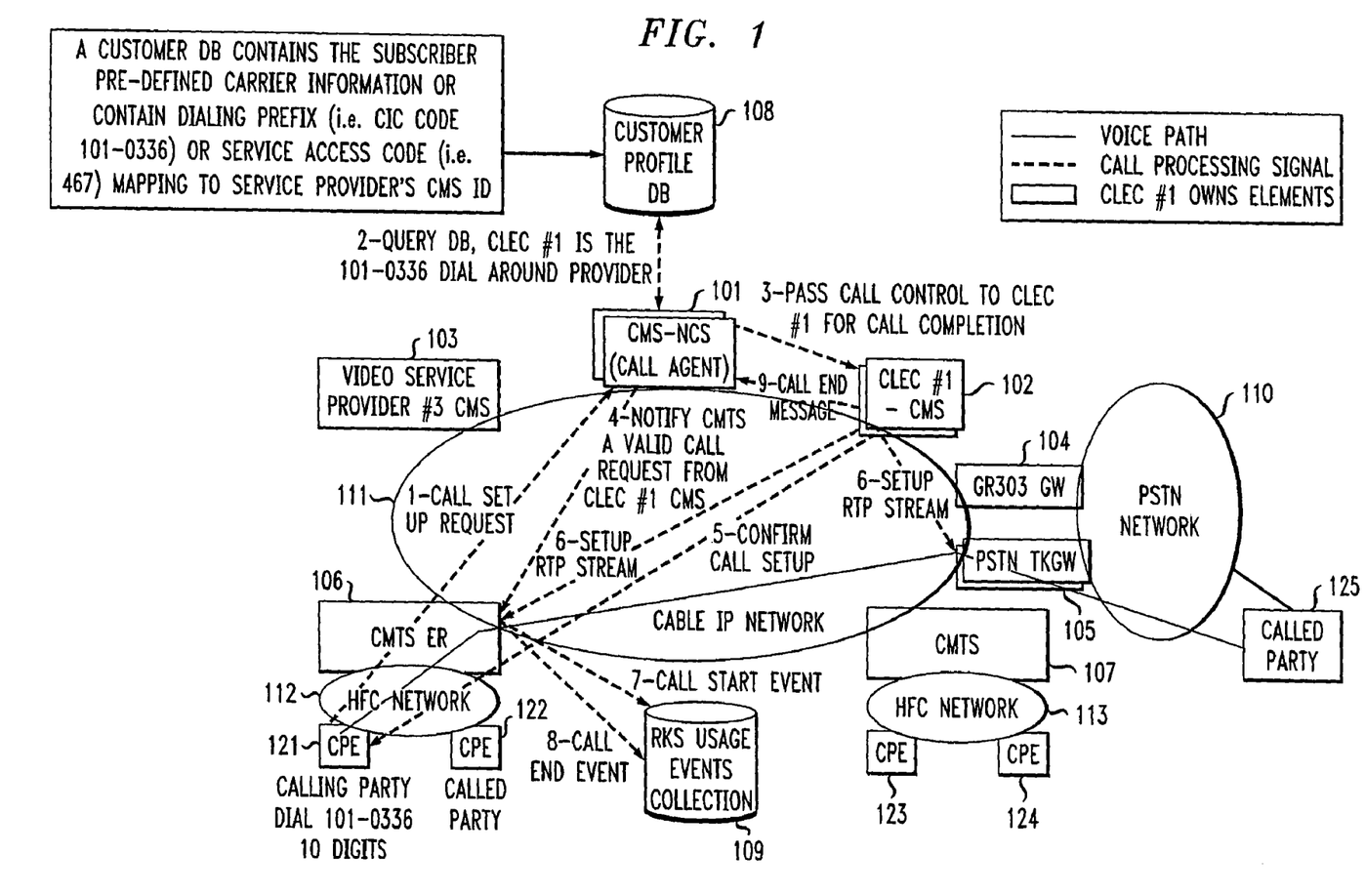
FIG. 1 shows a diagram of a hybrid fiber coax (HFC)-based cable IP telephony network service access architecture and operation according to an aspect of the present invention.

FIG. 1 illustrates an HFC-based cable IP telephony network service access architecture and operation according to a first embodiment of the invention. The network also includes conventional infrastructure networking elements, such as switches and routers, although they are not shown.

As illustrated, network 100 comprises a plurality of network managers in the form of CMSs, a plurality of gateway platforms, and a plurality of intelligent cable modem termination system (CMTS). CMSs comprise hand-off CMS 101, which serves as a call agent; a competitive local exchange carrier (CLEC) 102; and may also comprise a CMS to handle video and/or conference services of provider 103. The CMSs interface the network and coordinate with each other to provide a service according to the subscriber's data transfer needs using common network resources, such as bandwidth. Gateways comprise GR303 gateway platform 104 and PSTN trunking gateway 105, which access PSTN 110 to connect calls between cable IP network 111 and PSTN 110. Network managers include CMTS 106, coupled between cable IP network 111 and HFC network 112, and CMTS 107 coupled between cable IP network 111 and HFC network 113. Independent service providers may operate network managers 106 and 107.

A hand-off CMS 101 accesses a customer profile database 108 that maintains an index of users' inputs and their corresponding service provider CMSs. An exemplary index is shown in FIG. 3.

A network usage server 109 coupled to CMTS 106 monitors and collects usage data for subsequent billing during settlement of financial arrangements between CLECs, such as the operators or service providers of network managers 106 and 107 based on access records or an access plan. As a result, each network provider obtains revenue through access usage events. Information exchanged between network managers occurs by control signaling over the cable IP network 111.

Figure 2:
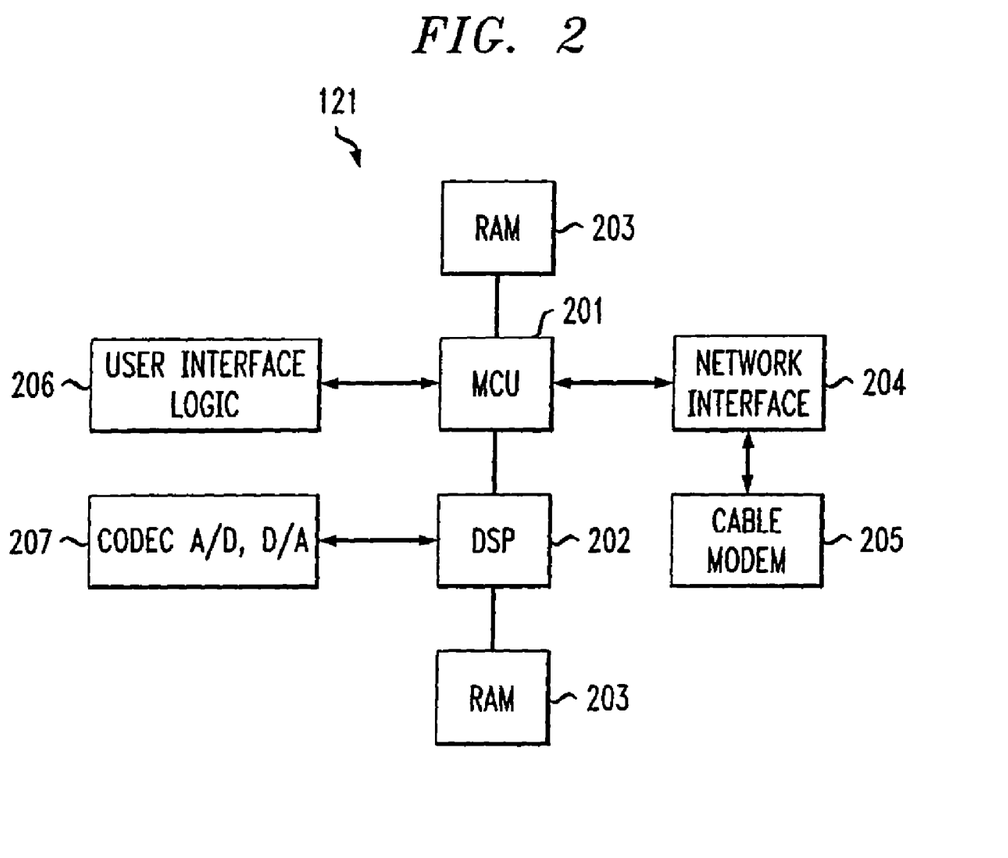
FIG. 2 is a functional block diagram of a sending or receiving terminal, e.g., a customer premise equipment (CPE), connected with a network manager of the cable IP network of FIG. 1.

The communication network further includes a number of sending and receiving terminals, such as CPE 121, 122, 123, 124, and 125 that may originate or receive messages over the network. FIG. 2 illustrates a functional block diagram of an embodiment of a CPE used in network 111 that supports protocols supplied to it by various service providers. CPE 121 preferably comprises a broadband telephony interface (BTI) or multimedia terminal adapter (MTA), e.g., a cable modem or a device with cable modem functionality. In the present embodiment, CPE 121 includes a programmable computing unit comprising microcontroller unit (MCU) 201, digital signal processor (DSP) 202, random access memory (RAM) 203, network interface 204, cable modem 205, user interface logic 206, and codec 207. DSP 202 performs voice- and image-related signal processing functions. Network interface 204 allows transmission and reception of packets to and from the CPE 121. User interface logic 206 provides a template to interpret incoming signals. Cable modem 205 may preferably comprise an HFC converter box, which communicates with an HFC network under established protocols, for example, DOSCIS standards. CPEs may also interface with service provider CMSs directly, receive and respond to call setup queries therefrom, and proceed with service control messaging.

Figure 3:
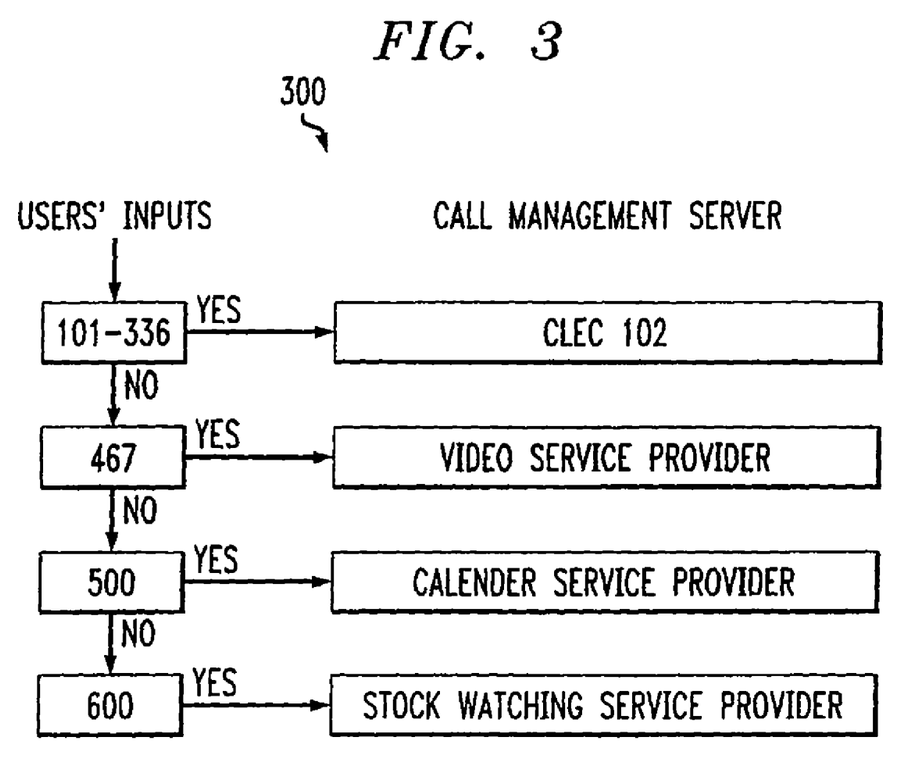
FIG. 3 shows an embodiment of an index map stored in a customer profile database according to an aspect of the present invention.

FIG. 3 illustrates an index map 300 maintained by customer profile database 108 according to an aspect of the present invention. Index map 300 includes service provider information pre-defined by users so as to map users' inputs to their corresponding service provider or CMS that handles the user. For example, carrier information code (CIC) 101-0336 corresponds to CLEC 102; a service access code 467 corresponds to the third CMS-video and/or conference service provider 103; and service access code 500 may correspond to a CMS providing calendar service. Pre-defined information in index map 300 may be combined with a dialing plan and/or service identification to enable a calling party's designation.

Figure 4:
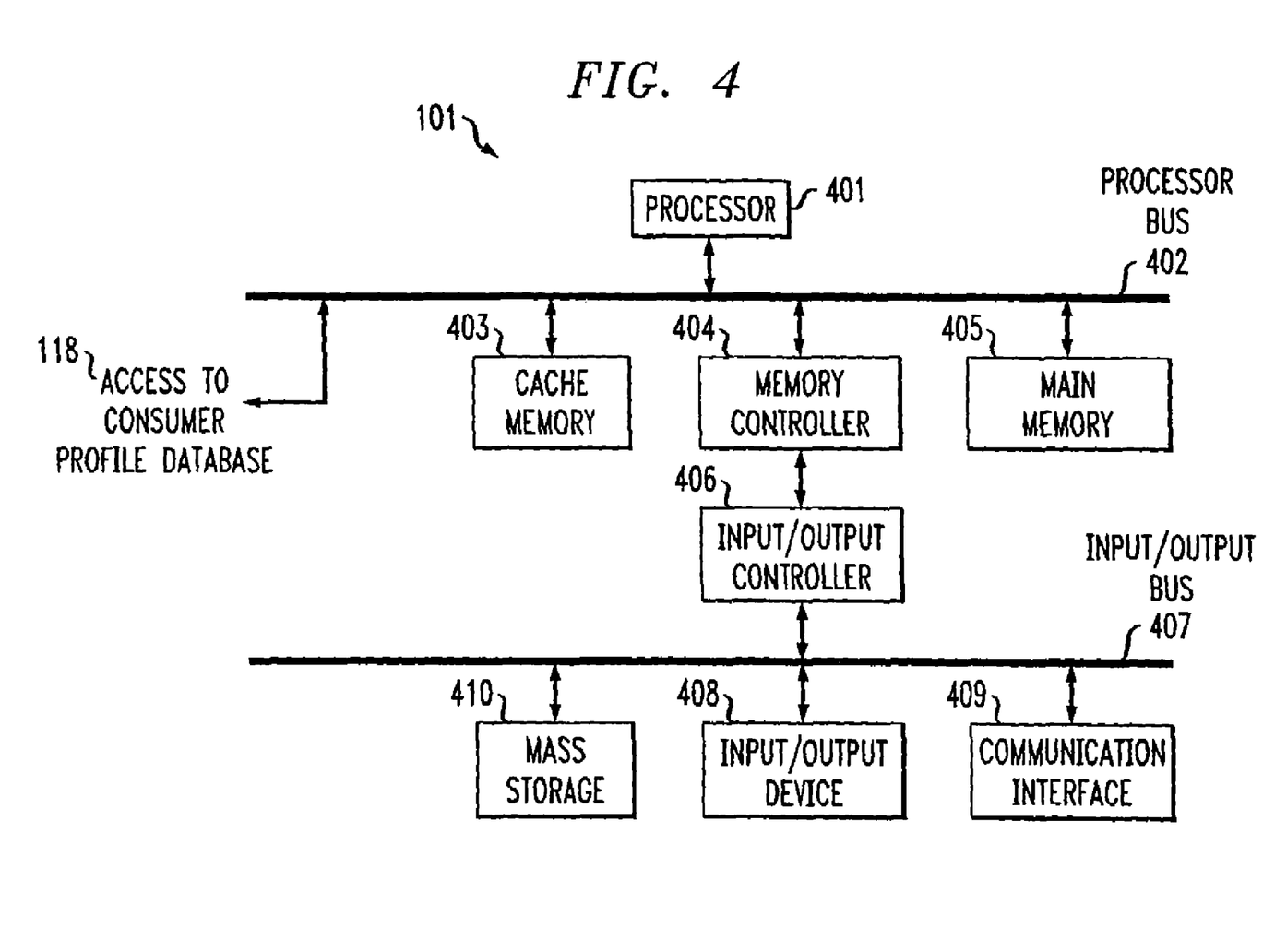
FIG. 4 shows a block diagram of a hand-off (CMS) according to an aspect of the present invention.

FIG. 4 shows a block diagram of an embodiment of a hand-off CMS 101. Hand-off CMS 101 includes processor 401, processor bus 402, cache memory 403, memory controller 404, main memory 405, input/output controller 406, input/output bus 407, input/output device 408, a communication interface 409, and a mass storage device 410. Hand-off CMS 101 may have an access to customer profile database 108 having information that may be transferred to mass storage device 410.

Hand-off CMS 101 receives signals from a user or subscriber, authorizes a call, and then transfers call control to CLEC 102, a CMS of an alternate service provider according to the calling party's input and index 300. Consequently, the calling party can designate his/her desired service provider CMS on a per-call basis using any combination of predefined information in index 300, dialing plan, and/or service identification. Working with information stored in customer profile database 108, hand-off CMS 101 enables a calling party to designate a service provider CMS on a per-call basis without any further network modification.

FIG. 1 also illustrates an operational process according to an embodiment of the present invention. Calling party dials 101-0336—a carrier information code designating the first CLEC 102—and a telephone number at CPE 121 to make a call to the called party 125. At step 1, a call setup request is sent to hand-off CMS 101, a network provider CMS, from CPE 121. Hand-off CMS 101 sends a query to customer profile database 108 and determines that the service provider CMS corresponding to calling party's input is the first CLEC 102, a service provider CMS (step 2). Hand-off CMS 101 passes call control to the first CLEC 102 for call completion (step 3). If the calling party is authorized, hand-off CMS 101 notifies CMTS 106 through HFC network 112 that there is a valid call request from the first CLEC 102. Otherwise the call is ended (step 4). The first CLEC 102 then confirms a call setup to CPE 121 (step 5) and sends a control signal to CMTS 106 and PSTN trunking gateway 105, setting up a real time protocol (RTP) stream between the CMTS 106 and PSTN gateway 105 (step 6). The calling party at CPE 121 may now talk to the called party 125 via a voice path through HFC network 112, CMTS 106, cable IP network 111, PSTN trunking gateway 105, and PSTN 110. CMTS 106 also sends call start event data to Record-Keeping Server (RKS) 109 to record usage events (step 7). When the calling party and the called party end their call, CMTS 106 sends call end event data to the RKS usage event collection server 109 (step 8), and the first CLEC 102 communicates a call end message to hand-off CMS 101 (step 9).

Figure 5:
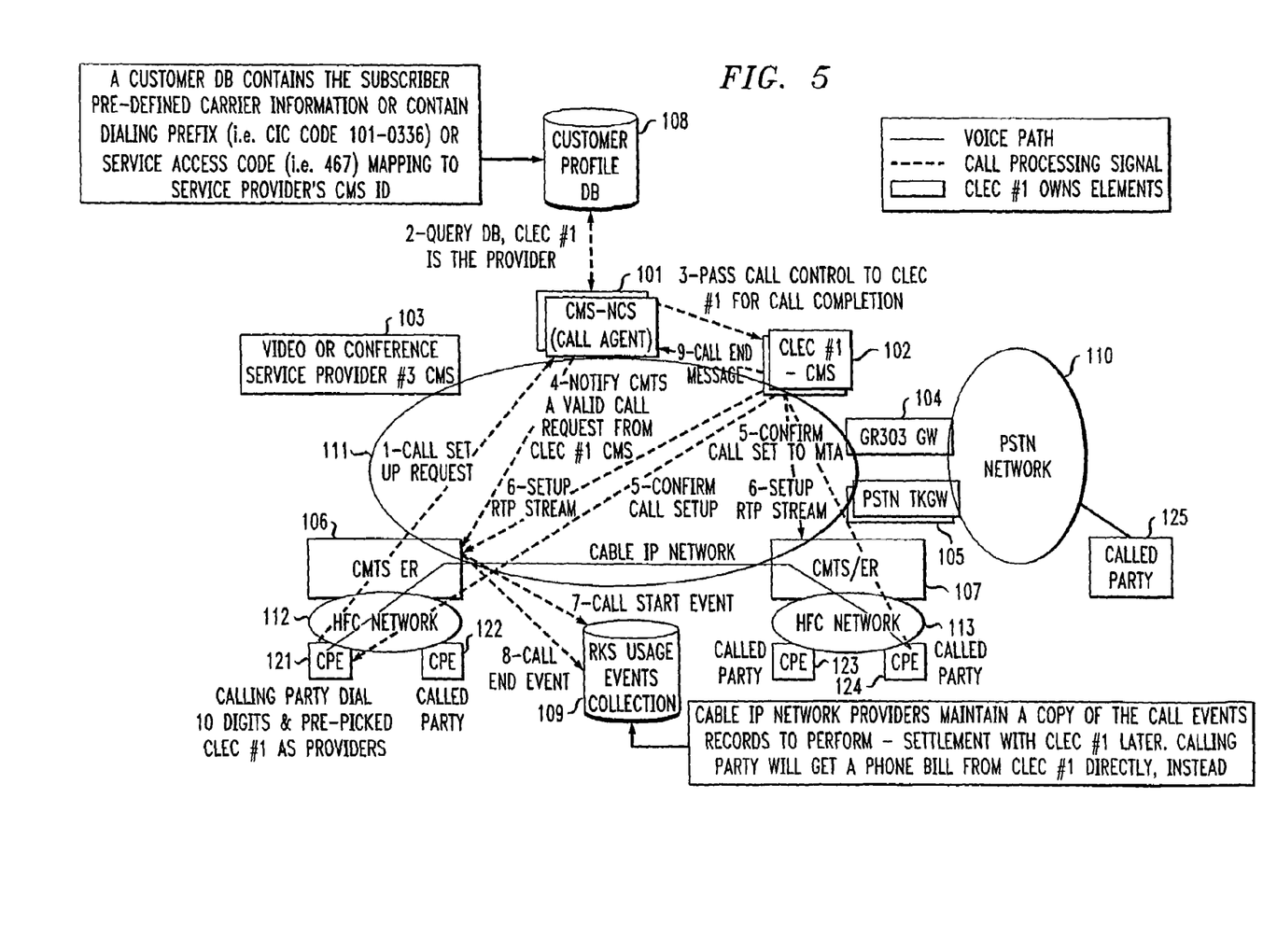
FIG. 5 shows an HFC-based cable IP telephony network according to another embodiment of the present invention.

FIG. 5 illustrates an HFC-based cable IP telephony network service access architecture and operation according to another embodiment of the invention. In the following description, for purposes of explanation, the same reference numbers are used to denote like elements of the network. Calling party dials 101-0336—a carrier information code designating the CLEC 102—and a telephone number at CPE 121 to make a call to called party 124. In a first step in the sequence, a call setup request is sent from CPE 121 (step 1) to hand-off CMS 101, which is a network provider CMS. In a second step, hand-off CMS 101 sends a query to customer profile database 108 and determines that the service provider CMS corresponding to calling party's input is the first CLEC 102, a service provider CMS. In a third step, hand-off CMS 101 passes call control to the first CLEC 102 for call completion. In a fourth step, if the calling party is authorized, hand-off CMS 101 notifies CMTS 106 through HFC network 112 that there is a valid call request from the first CLEC 102.

Otherwise the call is ended. In a fifth step, the first CLEC 102 then confirms call setup to CPE 121 and CPE 124 and, in a sixth step, sends control signal to CMTS 106 and CMTS 107, setting up a real time protocol (RTP) stream therebetween. In a seventh step, calling party at CPE 121 may now talk to the called party at CPE 124 via a voice path through HFC network 112, CMTS 106, cable IP network 111, CMTS 107, and HFC network 113. In the seventh step, CMTS 106 also sends call start event data to RKS usage event collection server 109 for recording. In the eighth step, when the calling party and the called party end their phone call, CMTS 106 sends call end event data to RKS usage event collection server 109 and, in a ninth step, the first CLEC 102 communicates call end message to hand-off CMS 101.

Figure 6:
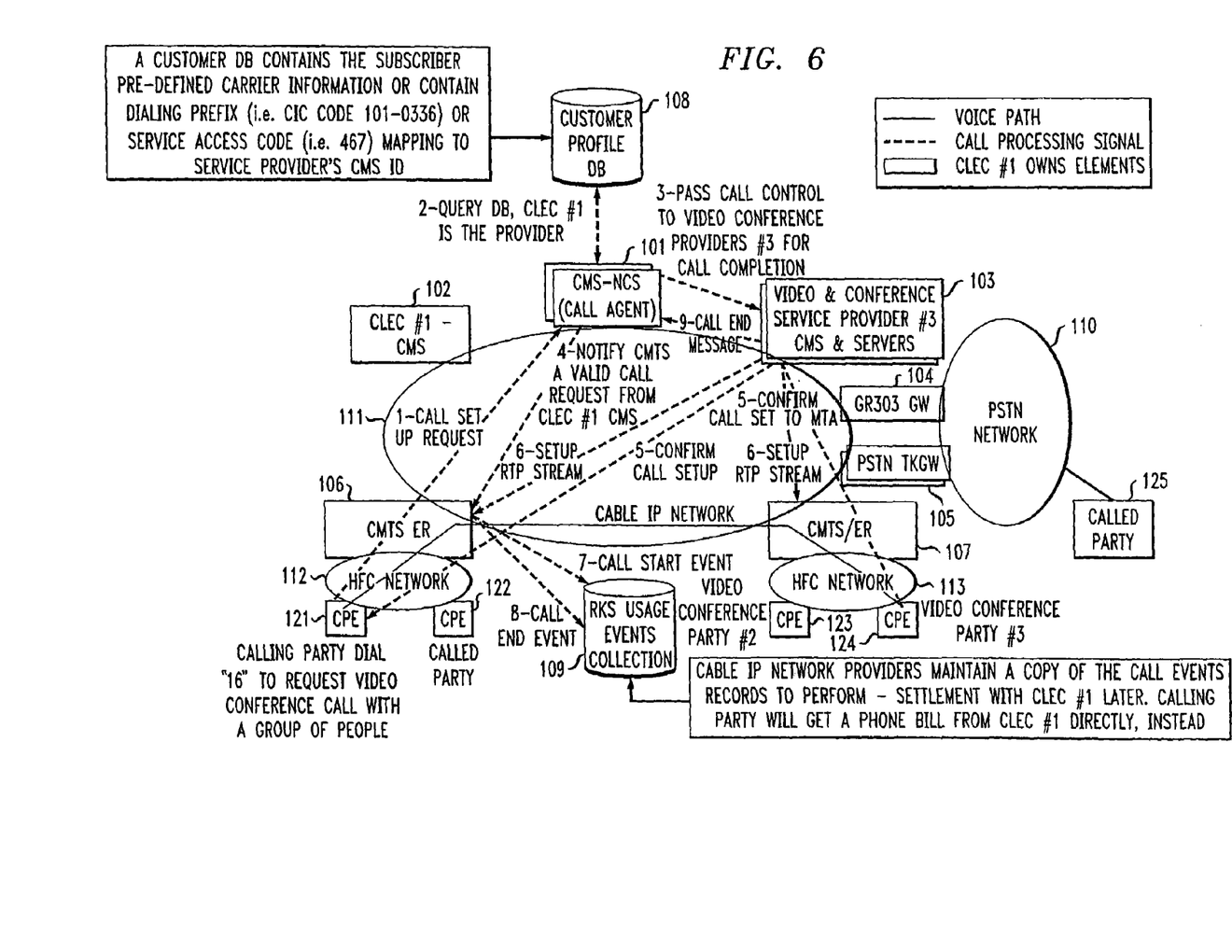
FIG. 6 shows another HFC-based cable IP telephony network according to an aspect of the present invention.

FIG. 6 shows a diagram of an HFC-based cable IP telephony network service access architecture and operation according to a third embodiment of the present invention. Calling party dials 467—a service access code designating the third CMS, the video and/or conference service provider 103—and a telephone number at CPE 121 to make a video conference call to videoconference parties CPE 123 and 124. A call setup request is sent to hand-off CMS 101, a network provider CMS, from CPE 121 (step 1). Hand-off CMS 101 sends a query to customer profile database 108 and determines that the service provider CMS corresponding to calling party's input is the video and/or conference service provider 103, a service provider CMS (step 2). Hand-off CMS 101 passes call control to video and/or conference service provider 103 for call completion (step 3). If the calling party is authorized, hand-off CMS 101 notifies CMTS 106 through HFC network 112 that there is a valid call request from video and/or conference service provider 103. Otherwise the call is ended (step 4). Video and/or conference service provider 103 then confirms call setup to CPE 121, 123 and CPE 124 (step 5), and sends control signal to CMTS 106 and CMTS 107, setting up an RTP stream therebetween (step 6). Calling party at CPE 121 now can have a videoconference with videoconference parties 123 and 124 via a signal path going through HFC network 112, CMTS 106, cable IP network 111, video and/or conference service provider 103, CMTS 107, and HFC network 113 in conventional ways. CMTS 106 also sends call start event data to RKS usage event collection 109 for recording (step 7). When the videoconference parties end their conference, CMTS 106 sends call end event data to RKS usage event collection 109 (step 8), and the video and/or conference service provider 103 communicates call end message to hand-off CMS 101 (step 9).

Figure 7:
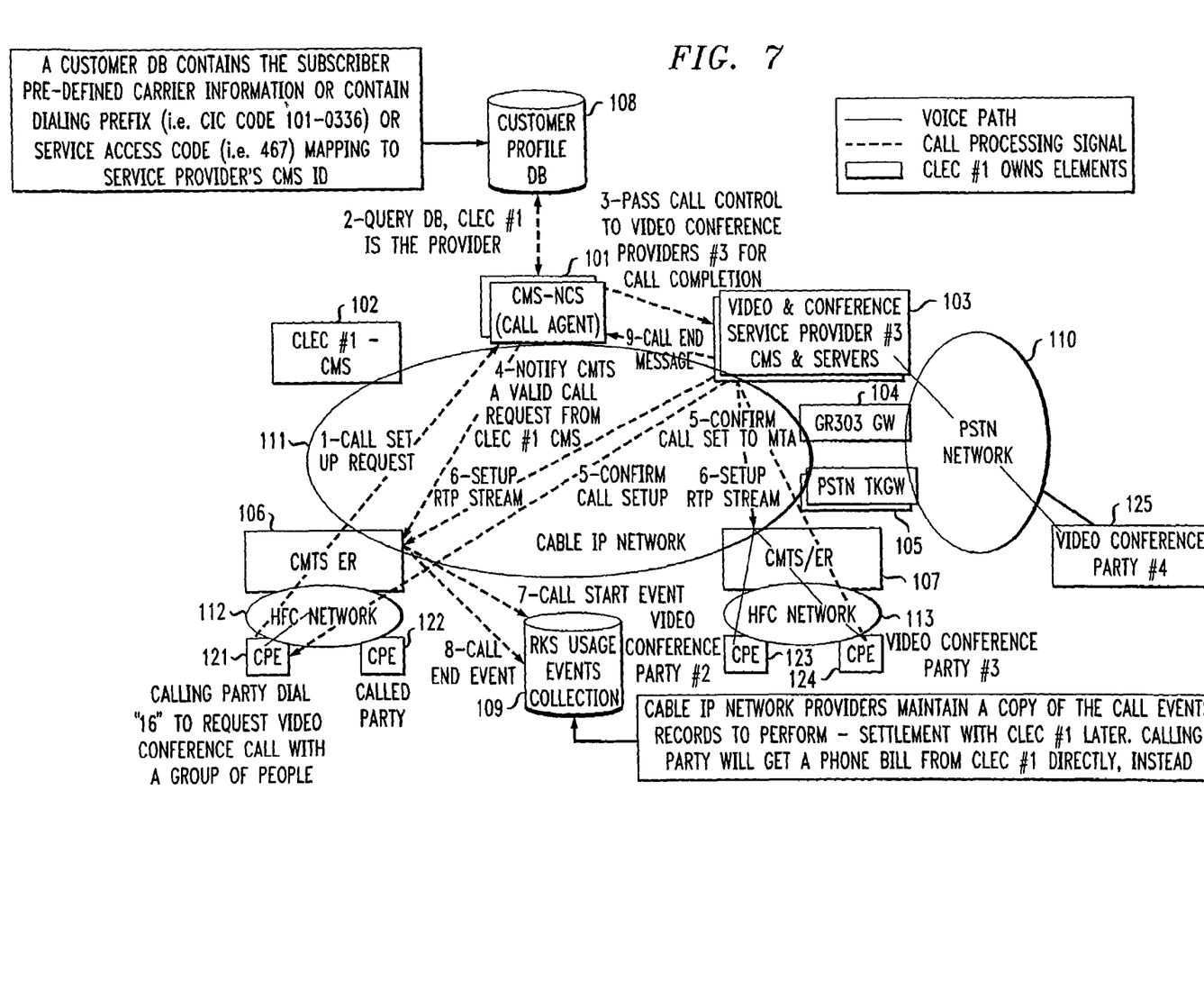
FIG. 7 shows another HFC-based cable IP telephony network according to yet another aspect of the present invention.

FIG. 7 shows a diagram of an HFC-based cable IP telephony network service access architecture and operation according to a fourth embodiment of the present invention. Calling party dials 467—a service access code designating the third CMS, the video and/or conference service provider 103—and a telephone number at CPE 121 to make a video conference call to videoconference parties, i.e., CPE 123, 124 and 125. A call setup request is sent to hand-off CMS 101, a network provider CMS, from CPE 121 (step 1). Hand-off CMS 101 sends a query to customer profile database 108 and determines that the service provider CMS corresponding to calling party's input is the video and/or conference service provider 103, a service provider CMS (step 2). Hand-off CMS 101 passes call control to video and/or conference service provider 103 for call completion (step 3). If the calling party is authorized, hand-off CMS 101 notifies CMTS 106 through HFC network 112 that there is a valid call request from video and/or conference service provider 103. Otherwise the call is ended (step 4). Video and/or conference service provider 103 then confirms call setup to CPE 121, 123 and CPE 125 (step 5) and sends a control signal to CMTS 106 and CMTS 107, setting up a real time protocol (RTP) stream therebetween (step 6). A signal path is setup between or among the calling party 121 and the videoconference parties 123 and 124 through HFC network 112, CMTS 106, cable IP network 111, video and/or conference service provider 103, CMTS 107, and HFC network 113. Videoconference party 125 is connected to video and/or conference service provider 103 through PSTN network 110 and joins this signal path. Calling party at CPE 121 now can have videoconference with parties 123, 124 and 125 via the signal paths in a conventional way. CMTS 106 also sends call start event data to RKS usage event collection 109 for recording (step 7). When the videoconference parties end their conference, CMTS 106 sends call end event data to RKS usage event collection 109 (step 8), and the video and/or conference service provider 103 communicates call end message to hand-off CMS 101 (step 9).

Based on the teachings provided herein, modifications and changes may be made by those skilled in the art without departing from the spirit and scope of the invention. Accordingly, the invention defined by the appended claims is deemed to include such modifications and changes.

What is claimed is:

1. A method of transferring call control between a first terminal and a second terminal comprising:
    controlling, by a first service provider, access of the first terminal relative to an originating network via a first provisionable module;
    controlling, by a second service provider, access of the second terminal relative to a receiving network a a second provisionable module; and
    in response to a call control parameter issued by a call agent communicating with the originating and receiving networks over an Internet Protocol (IP) network, provisioning the first terminal to respond to a call setup and control message issued from the receiving network to effect a hand-off of control of the first terminal from the originating network to the receiving network.

2. The method of claim 1, further comprising the call agent obtaining an authorization from a subscriber prior to effecting said hand-off of control.

3. The method of claim 1, further comprising the call agent obtaining call setup and control information for provisioning the first terminal from at least one of: a subscriber, a database, a call type, or a dialing plan.

4. The method of claim 3, wherein said provisioning of the first terminal occurs on a call-by-call basis.

5. The method of claim 3, further comprising: monitoring an usage of the first and second terminals for determining a user fee for use of said networks.

6. The method of claim 5, wherein at least one of said originating and receiving networks comprises a hybrid coaxial fiber network.

7. The method of claim 1, wherein each of the first and second terminals comprises at least on of: a broadband terminal, a cable modem, a broadband telephony interface, or a multimedia terminal adapter; and each of the originating and receiving networks comprises at least one of: a hybrid fiber coaxial network, a PSTN network, a broadband network.

8. In communication network that provides a path between a sending terminal an a receiving terminal, comprising:
    a first network manager operated by a first service provider that manages network access of the sending terminal;
    a configuration module the sending terminal for receiving information that controls access of said sending terminal to a sending network;

a second network manager operated by a second service provider that manages network access of the receiving terminal;

a configuration module of the receiving terminal for receiving information a that controls access of said receiving terminal to a receiving network; and a call control agent in communication with the first and second network managers to effect a transfer of access control of the sending terminal from the first network manager to the send network manager in response to a call control parameter.

9. The communication network of claim 8, wherein the call control agent effects provisioning of the configuration modules of the sending and receiving terminals according to information obtained form at least one of: a subscriber, a database, a call type, a dialing plan, or a destination of the receiving terminal.

10. The communication network of claim 9, wherein the sending network comprises a hybrid fiber coaxial (HFC) network, the first network manager comprises a cable modem termination system (CMTS), and the sending terminal monitoring an usage of the first and second terminals for determining a user fee for use of said networks.

11. The communication network of claim 9, wherein said receiving terminal resides on a PSTN network, and said second network manager controls a gateway between an Internet Protocol (IP) network and the PSTN network.

12. The communication network of claim 9, wherein each of the first and second network managers comprises a cable modem termination system (CMTS), each of the sending and receiving networks comprises a hybrid fiber coaxial network, and the first network manager transfers control of a call to the second network manager in response to said call control parameter.

13. The communication network of claim 9, wherein the second network manager provides a video conference service by configuring multiple terminals needed to intercommunicate via a conferencing gateway.

14. A system for linking a sending terminal of a sending network with a receiving terminal of a receiving network, comprising:

a first configuration module co-located with at least one of the sending terminal or the sending network;

a first network manager operated by a first service provider to bridge the sending network and an Internet Protocol (IP) network;

a second configuration module co-located with at least one of the receiving terminal or the receiving network;

a second network manager operated by a second service provider independent of the first service provider that is operative to bridge the receiving network and the IP network; and a controller in communication with the first and second network managers to effect a transfer of call control from the first network manager to the second network manager in response to a call control parameter.

15. A system for linking a sending network and a receiving network that respectively support a sending terminal and at least one broadband receiving terminal, comprising:

a first configuration module of the sending terminal that defines a service access procedure according to control information supplied by a subscriber on a per call basis;

a first network manager operated by a first service provider to bridge the sending network and an Internet Protocol (IP) network;

a second configuration module of the receiving terminal for defining a service access protocol that controls a conveyance of information between the sending terminal and the receiving terminal;

a second network manager operated by a second service provider to bridge the receiving network a d the IP network; and a controller in communication with the first network manager and the second network manager to effect a transfer of call control from the first network manager to the second network manager by enabling provisioning of the first and second configuration modules to implement at least one service access procedure required by a handoff.

16. An Internet Protocol (IP) network for linking a sending customer premise equipment (CPE) of a sending network and a receiving CPE of a receiving network, comprising:

a first configuration module of the sending CPE;

a cable modem termination system (CMTS) of an hybrid fiber coax (HFC) network operated by a first service provider for authorizing and bridging a call between the sending CPE and he receiving CPE according to a service access protocol;

a second configuration module of the receiving CPE;

a network manager operated by a second service provider for effecting a link between the sending and receiving CPEs through the receiving network and the IP network by configuring a least one of the first and second configuration modules; and a controller that effects a hand-off of call control from the CMTS to the network manager by effecting provisioning of the first and second configuration modules to implement a given service access procedure according to a call control parameter.

17. The network of claim 16, wherein the controller effects the hand-off by provisioning the first configuration module to respond to at least one setup instruction from the network manager operated by the second service provider.

18. The network of claim 17, wherein the controller enables a subscriber selection of a forwarding service provider or a receiving service provider on a call-by-call basis.

19. The network of claim 18, wherein the controller enables a video conferencing service, a calendar service, or a stock watch service.

20. The network of claim 16, wherein the controller enables provisioning of a service access protocol according to one of selection by a subscriber, an entry in a database, a call type, a call destination, a dialing plan of the sending CPE, or a service identification associated with the sending CPE.

21. The network of claim 20, wherein the controller transfers call control to the network manager a handle the call according to a provisioning implemented by the first configuration module.

22. The network of claim 20, further including a usage server (RKS) that keeps track of call events ir order to enable a settlement of a network usage fee for use of the network.

23. The network of claim 22, wherein the usage server uses internetwork signaling to obtain network usage information upon which to enable a determination of said network usage fee.

* * * * *